United States Patent [19]

Lucey

[11] Patent Number: 4,490,584
[45] Date of Patent: Dec. 25, 1984

[54] INFRARED REMOTE TELEPHONE SYSTEM LEVEL CONTROL

[75] Inventor: Robert E. Lucey, Sudbury, Mass.

[73] Assignee: Controlonics Corporation, Westford, Mass.

[21] Appl. No.: 476,626

[22] Filed: Mar. 18, 1983

[51] Int. Cl.³ .............................................. H04M 1/60
[52] U.S. Cl. ................................. 179/100 L; 179/2 R
[58] Field of Search ................ 179/2 R, 2 EA, 100 L, 179/81 B; 381/105, 107, 108, 109; 455/614, 617, 618, 619

[56] References Cited

U.S. PATENT DOCUMENTS 3,596,011 7/1971 Alexandrovich ............. 179/81 B X
4,291,411 9/1981 Müler et al. ........................ 455/352

Primary Examiner—Gene Z. Rubinson
Assistant Examiner—James L. Dwyer
Attorney, Agent, or Firm—Weingarten, Schurgin, Gagnebin & Hayes

[57] ABSTRACT

A telephone system having a remote microphone and associated transmitter, and a network located receiver for signals outgoing over the telephone network and including a local loudspeaker to broadcast signals incoming over the telephone network wherein the loudspeaker audio level is controlled to vary with the level of the received microphone signal. The level of the loudspeaker signal is increased when the received microphone signal increases, and vice versa, allowing the user to control the loudspeaker level by adjusting mouth-to-microphone distance or speech loudness. In particular implementation the signal applied to the network from the remote microphone receiver is automatically attenuated above a certain level to match network requirements. The degree of attenuation is used to cause a corresponding increase in the loudspeaker volume level. Harmful feedback is avoided since loop gain remains constant. Proper microphone signal level and loudspeaker volume are assured by the reflex reaction of bringing the microphone closer to the mouth or speaking louder if loudspeaker volume is too soft.

12 Claims, 3 Drawing Figures

INFRARED REMOTE TELEPHONE SYSTEM LEVEL CONTROL

FIELD AND BACKGROUND OF THE INVENTION

The present invention relates to remote telephone systems in which a remote unit transmits outgoing telephone signals from a microphone to a network associated receiver for transmission over the telephone network and receives incoming messages from the telephone network for application to a loudspeaker from which incoming messages are broadcast to the user at the remote unit. In such systems the distance between the remote unit and the network associated system can vary significantly. This variation will affect the perceived level of the signal broadcast on the loudspeaker. In addition, variations in telephone network line characteristics can change the signal level and noise on the incoming message received for broadcast by the loudspeaker.

In order to adapt the signal level of messages applied to the network some form of automatic attenuation or gain control is typically utilized to attenuate the signal received from the remote unit so that when it is applied to the network it will not exceed a predetermined signal level and is generally maintained at that level. Circumstances can exist where the received signal level is insufficient to maintain that level and permit application of a signal of desired strength to the network, for example, if the microphone on the remote unit is held at too great a distance from the user's mouth or the user speaks too soft. Some means is therefore desirable to prevent this circumstance.

Because, as noted above, the perceived signal level of the audio broadcast from the loudspeaker to the user at the remote location can vary, some form of volume control over this broadcast level is desirable to maintain a predetermined loudness or preceived loudness at the location of the remote unit. Such a volume control, however, must be under the control of the user at the remote unit in order to be practical. The capability of providing remote volume control does not exist or would exist only through the additional complexity of the transmission from the remote unit of an additional control signal.

SUMMARY OF THE INVENTION

In accordance with the teaching of the present invention, a remote telephone system is provided having a hand-held remote transmitter unit responsive to microphone input and a network associated receiver for receiving the microphone signal transmitted by the remote unit, and responsive to signals from the network for audible broadcast thereof to the region of the remote unit via a loudspeaker. The received microphone signals are passed through an attenuator before application to the telephone network to achieve a desired signal level. The audible loudspeaker signals are amplified to a degree corresponding to the amount of the attenuation. The user at the remote unit is thus able to control the volume of the signal broadcast by the loudspeaker by adjusting the distance between his mouth and the microphone on the remote unit which correspondingly affects the received microphone signal level and the degree of attenuation applied to that signal before it is sent over the telephone network. As a result, the reception of a signal of inadequate strength for application to the network is signaled to the user by a very soft signal from the loudspeaker. This produces, in turn, a natural reflex reaction on the part of the user to bring the microphone closer or to speak up, correcting the low signal situation.

In most telephone communication systems, a hybrid coupler is used to isolate incoming and outgoing signals at the juncture with the telephone network. Because this isolation is limited, if the signal from the local loudspeaker is received by the remote microphone with a sufficiently great amplitude, unacceptable feedback may occur. However, feedback from loudspeaker to microphone is avoided by a constant system gain provided by matching attentuation in outgoing signal with amplification of the loudspeaker broadcast signal.

In a preferred embodiment, the remote unit microphone signal controls the pulse rate of a pulse train. These are applied to an infrared emitter transmitting the pulses as light to the network located receiver where the original microphone signal and signal level are recovered and amplified. An automatic gain control system peak detects this amplified signal and derives from it a control signal to adjust the amplified, recovered signal level to a maximum level defined in accordance with the requirements of the telephone network. The loudspeaker amplifier circuitry gain is varied in response to the control signal used to adjust the microphone signal to achieve the result of having the speaker loudness controlled to increase with the level of the received microphone signal. To achieve this effect the control signal used to attenuate the outgoing microphone signal is used to provide a corresponding increase in gain in the speaker's audio amplifier circuitry. This circuitry maintains a constant loop gain so that feedback through the hybrid coupler does not cause unacceptable results.

During dialing, the automatic gain control function is suppressed and a constant, gain level maintained in the outgoing DTMF signals. At the same time microphone pick-up is suppressed to avoid noise interference while the dialing tones are broadcast by the speaker. The system can be switched in or out of controlled gain modes to permit maximum gain.

BRIEF DESCRIPTION OF THE DRAWINGS

These and other features of the present invention will be better understood from a reading of the following solely exemplary detailed description taken together with the drawing wherein.

DETAILED DESCRIPTION OF THE INVENTION

Figure 1:
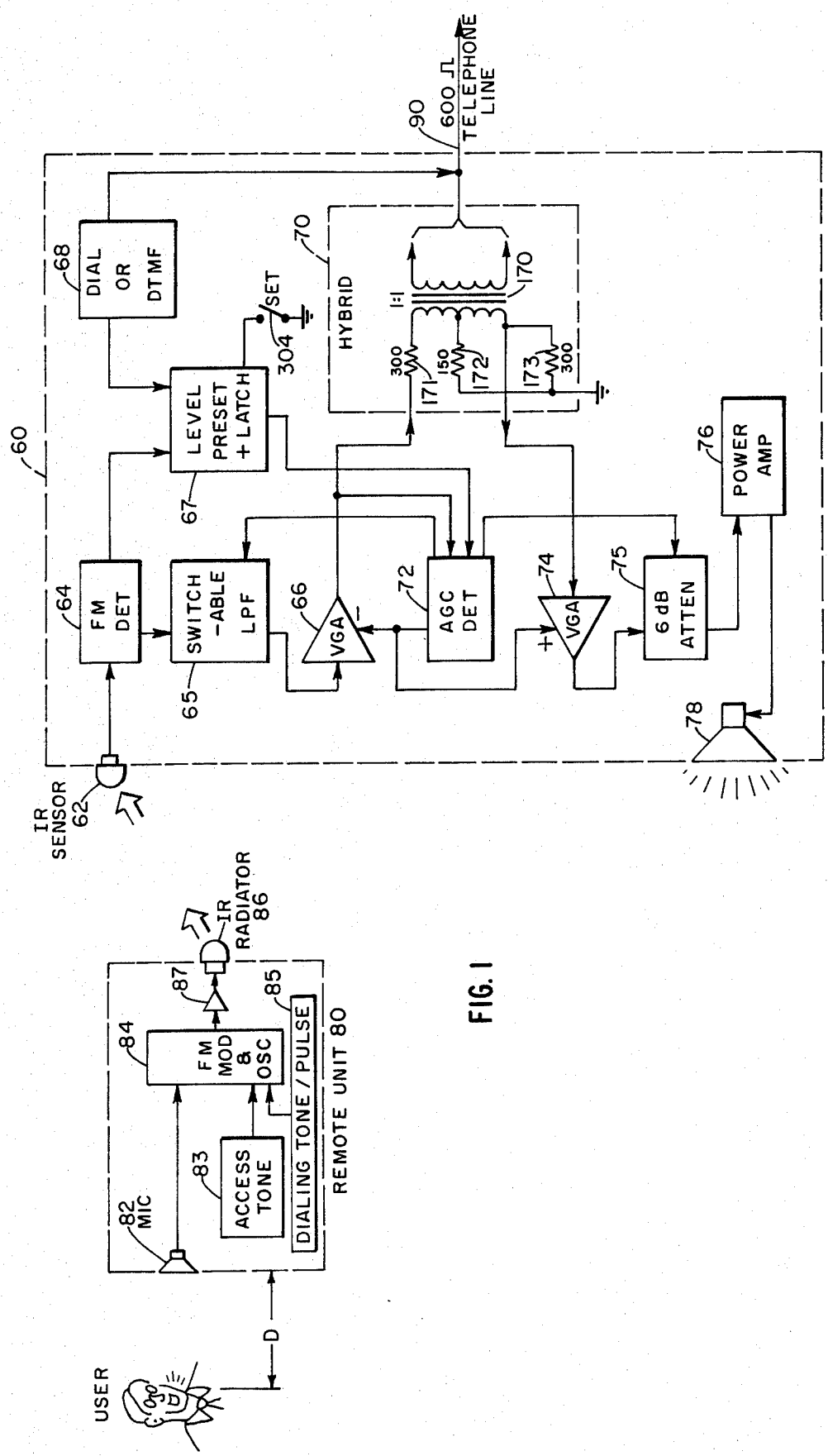
FIG. 1 is a block diagram of a telephone set according to the present invention.

A block diagram of the telephone system according to the present invention is shown in FIG. 1. The user communicates over the lines 90 of a telephone network via a remote unit 80 and a local unit 60. The user speaks into a microphone 82 contained in the remote unit 80. The signal from the microphone 82 is applied to a modulator 84 where an oscillator generated pulse train is rate, or frequency modulated by the audio. A power amplifier 87, amplifies this pulse train which pulse activates an infrared radiator 86, consisting of one or more light emitting diodes. In addition, an access tone is produced by a generator 83, and dialing tone or pulse signals are produced by a dialing generator 85 under operator control. The microphone is muted during dialing to avoid room noise that might conflict with the dial signals. The signal produced by the infrared radiator 86 is received by an infrared sensor 62 on the local unit 60. The infrared sensor 62 provides a signal to a frequency modulation detector 64 which produces an audio output signal corresponding to the signal produced by the microphone 82 in the remote unit 80. Detector 64 also provides an output indication of reception of an access tone and dial tones or pulses to a level preset and latch circuit 67. The audio and dial signals from the FM detector 64 pass through a switchable low-pass filter 65, are amplified by a variable gain amplifier 66 and are then applied through a hybrid coupler 70 for transmission over a telephone network 90. The gain of the variable gain amplifier 66 is controlled by an automatic gain control (AGC) detector 72, which responds to the output of amplifier 66 during voice transmission to maintain a maximum output level. The switchable low-pass filter 65 is controlled by receipt of detected dialing signals through the AGC detector 72 to increase the bandwidth to accommodate dialing signals and narrow it during audio transmission to avoid feedback at speaker resonant frequencies. During dialing speaker path gain is reduced to avoid oscillations. During dialing the AGC function is suppressed allowing the dialing tones to exceed the AGC regulated level. The output of amplifier 66 is otherwise held at a level acceptable to the telephone network for all inputs above a certain level. A switch 304 controls preset and latch circuit 67 to permit the operator to set the system for maximum gain in conditions of long listening only.

The hybrid coupler 70 applies the outgoing signal to telephone network and applies the incoming signal to a variable gain amplifier 74 without objectionable crosstalk. The hybrid coupler is available from several sources and has the characteristic of a selectable amount of isolation between incoming and outgoing signals.

The hybrid used in the particular embodiment disclosed comprises a transformer having a 600 ohm center tapped primary, and a secondary equal to the telephone line impedance, typically 600 ohms. A 150 ohm resistor 172 is connected to the primary center tap and to signal ground, and two 300 ohm resistors 171 and 173 are each connected to an end of the primary winding. The remaining end of resistors 171 and 173 are connected to the output of the amplifier 64 and to signal ground, respectively. The incoming signal is received by amplifier 74 at the junction of resistor 173 and the transformer primary. Good isolation of incoming and outgoing signals is provided when proper circuit impedances are maintained.

The incoming signal from the telephone line 90 and hybrid coupler 70 is amplified by the variable gain amplifier 74. The output of amplifier 74 passes through a switchable 6 dB attenuator 75 and is applied to a power amplifier 76 the output of which drives a loudspeaker 78 to enable the user to hear the incoming signals. The variable gain amplifier 74 and switchable 6 dB attenuator 75 receive control signals from the automatic gain control detector 72, to adjust the gain of amplifier 74 and control the attenuator 75. The control signal from the automatic gain control detector 72 increases the gain of the amplifier 74 by an amount corresponding to the attenuation produced in the amplifier 66. During dialing the gain of amplifiers 74 and 66 are preset and attenuator 75 is activated.

The telephone user is returned a signal from the loudspeaker 78 of amplitude varying in intensity with the intensity of the signal received from the microphone 82. The user may and is psychologically forced to adjust the distance and loudness by which he speaks into the microphone 82 according to the sound level he hears from the loudspeaker 78. Moreover, with the increase in the gain of the variable gain amplifier 74 selected to equal the decrease in gain of the variable gain amplifier 66, a constant loop gain throughout the telephone system is achieved which prevents the introduction of acoustic feedback between the loudspeaker 78 and the microphone 82 by action of the automatic gain control circuitry.

Figure 2:
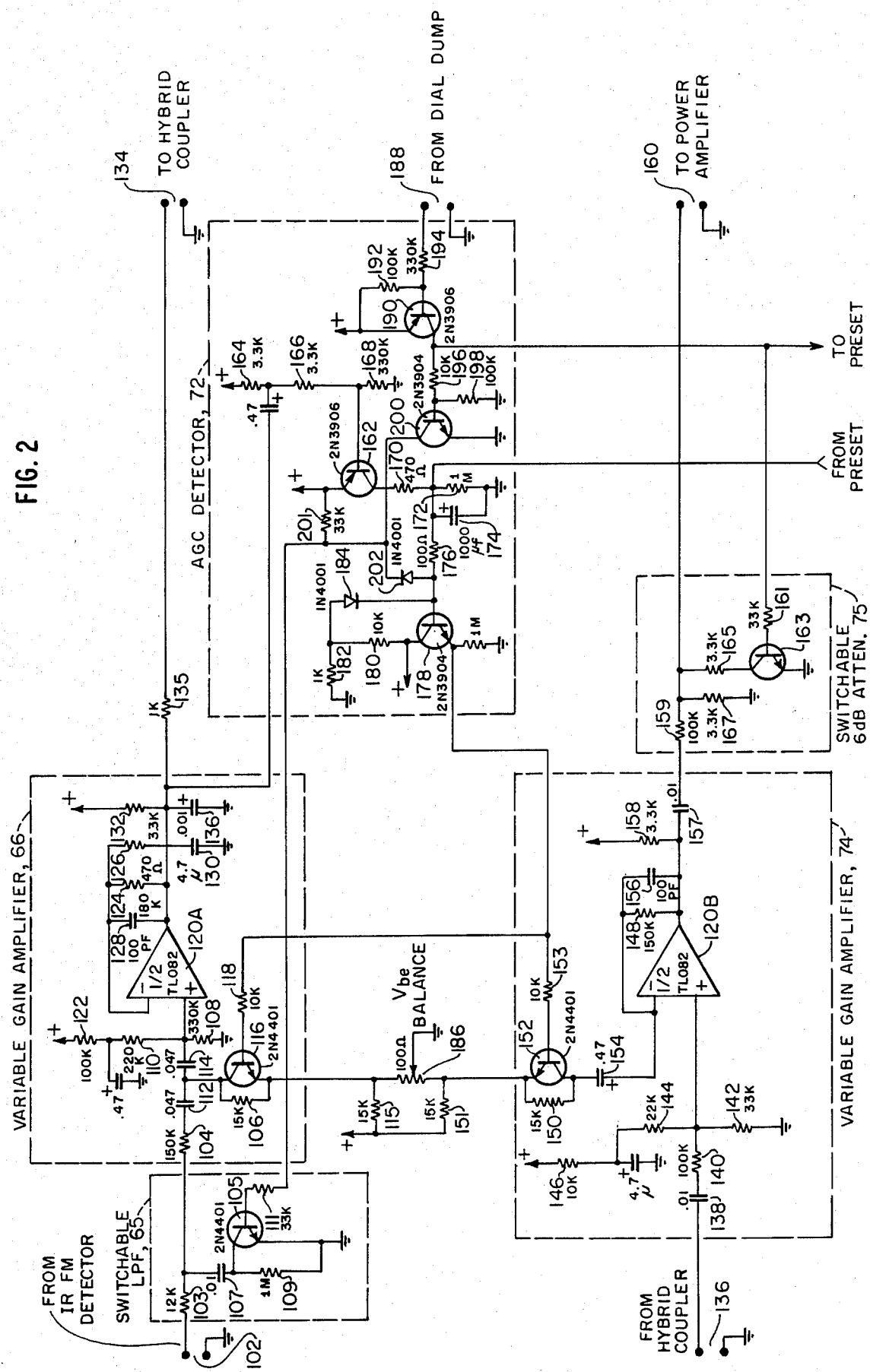
FIG. 2 is a schematic diagram of the automatic gain control and variable gain amplifier circuits of FIG. 1.

The circuitry of the variable gain amplifiers 66 and 74, the switchable low-pass filter 65, the switchable attenuator 75, the switchable attenuator 75, and the automatic gain control (AGC) detector 72 is shown in FIG. 2. The dial or dual tone multifrequency circuit 68 is of known design. The signal provided by the infrared FM detector 64 is received at an input 102 of the switchable filter 65. The low-pass filter characteristic is determined by a resistor 103 in combination with a capacitor 107 when a transistor 105 is energized by a signal received through a resistor 111 from the AGC detector 72. When transistor 105 is not energized, resistor 109 becomes part of the filter, extending the pass-band. The control signal from the AGC detector 72 energizes the transistor 105 (lowering the cutoff frequency) after dialing. When dialing, the pass-band of the filter 65 is maximum.

The input of the variable gain amplifier 66 is an audio frequency signal which is passed through a capacitively coupled attenuator formed by resistors 104, 106, 108, and 110, capacitors 112 and 114, and transistor 116. At audio frequencies, a variable attenuator is formed by resistor 104 and the parallel combination of transistor 116 and resistor 106 to form a voltage divider. As the transistor 116 is energized by a current through resistor 118 from AGC detector 72, the transistor 116 becomes increasingly conductive, acting as a resistor having an increasingly lower resistance. As the transistor 116 becomes more conductive, the audio signal level at the collector of transistor 116 is thus increasingly attenuated. This signal is passed to the non-inverting input of an operational amplifier 120A through capacitor 114. The non-inverting input of the amplifier 120A is biased by resistors 108, 110 and 122. The gain of the amplifier 120A is defined by a resistor 124 with capacitor 128 in parallel in a negative feedback loop, together with a serially connected resistor 126 and capacitor 130 leading to ground. The amplifier load resistor 132 is connected between the power supply and the output of the amplifier 120A and the output of amplifier 120A is connected through a resistor 135 to the hybrid coupler 70 of FIG. 1 (via a line driving amplifier, not shown).

The signal incoming over the telephone lines from the hybrid coupler 70 is received at an input 136 of the amplifier 74. This signal is coupled to the non-inverting input of an operational amplifier 130B through a capacitor 138 and a resistive attenuation network formed by resistors 140, 142 and 144. This input of the amplifier 120B is DC biased according to the resistors 142, 144 and 146 to provide an output signal having a quiescent level approximately midway between the power supply and ground potentials. The gain of the amplifier 120B is established by a feedback network comprising a combination of resistors 148 and 150 and transistor 152. Capacitors 154 and 156 provide DC isolation and high frequency roll-off characteristics respectively. In operation, the conduction of transistor 152 is controlled by the AGC detector 72, becoming more conductive with increasing microphone signal level. The amount of feedback signal through resistor 148 to the inverting input of the amplifier 120B is accordingly reduced. Similarly, as the transistor 152 is made less conductive by a reduced base current, resistor 150 becomes the dominant component of that feedback combination. The output terminal of the amplifier 120B is connected to a load resistor 158 and the signal at this junction is coupled through a capacitor 157 to form the output of the amplifier 74.

The AGC detector 72 is illustrated in FIG. 2 to include peak-detector circuitry having a transistor 162 which is biased between resistors 164, 166 and 168 to begin to conduct when the signal amplitude of the output of amplifier 66 exceeds a predetermined peak voltage. When the transistor 162 begins to conduct, a current flows through resistor 170 and which in turn causes a capacitor 174 to charge to a positive voltage according to the time constant determined by resistor 170 and capacitor 174. Resistor 172 provides a discharge path. The voltage on the capacitor 174 is passed through a resistor 176 to the base of a transistor 178. The transistor 178 operates in an emitter follower mode with its output providing a low impedance signal, through resistors 118 and 153, to the bases of respective transistors 116 and 152 and increasing their conduction. The gains of amplifiers 66 and 74 are thus changed oppositely.

The signal at the base of transistor 178 is kept at a minimal level defined by the voltage from the divider network of resistors 172, 176, 180 and 182 with diode 184. This minimal voltage maintains a voltage on capacitor 174 to reduce the AGC attack time. Transistors 116 and 152 in the respective variable gain amplifiers 66 and 74 are matched in attenuation produced by the FIG. 2 circuitry for given base currents. As the $V_{be}$ is likely to vary considerably among transistors, and it is desirable according to the present invention that the variable gain actions of amplifiers 66 and 74 be equal and opposite, the attenuation actions of transistors 116 and 152 are balanced by operation of a voltage divider formed by resistors 115 and 151 and potentiometer 186. The voltage divider thus formed allows an adjustment in the emitter voltages of one transistor relative to the other transistor.

The AGC detector 72 also contains circuitry to greatly reduce the gain of the amplifier 74 to the fixed levels without AGC when a signal is produced from the dial-up or dual tone multi frequency (DTMF) circuitry 68 of FIG. 1. When dialing occurs, a logic signal from the dial circuitry 68 is received at an input 188 of a transistor 190, causing it to conduct. Under dialing conditions, the transistor 190 conducts and sends current through resistors 196 and 198, in turn causing a transistor 200 to conduct through a load resistor 201. Transistor 200 in this state drives the base of transistor 178 toward ground thru a diode 202. AGC capacitor 174 is simultaneously discharged thru diode 202 via a resistor 176. Diode 202 prevents total discharge of capacitor 174, leaving transistor 178 at a defined low conduction level and reducing AGC attack time. The lowered output of transistor 178 in turn causes the amplifier 120B to reduce its gain to a preset level since it is desirable that during dialing or start-up conditions, the signal passed through amplifier 120B be reduced, but not entirely eliminated and not subject to AGC effects. The dialing pulses acting on transistor 190 also cause a "preset" signal to be applied to the level preset and latch circuit 67, described in FIG. 3, and to the transistor 163 in the attenuator 75. These pulses turn transistor 163 on, adding 6 dB of attenuation in the output of amplifier 74. The dial pulses, twice inverted by the combination of transistors 190 and 200, turn off transistor 105 in filter 65, broadening the bandwidth for each DTMF signal. With dial pulses broadening is not necessary.

Figure 3:
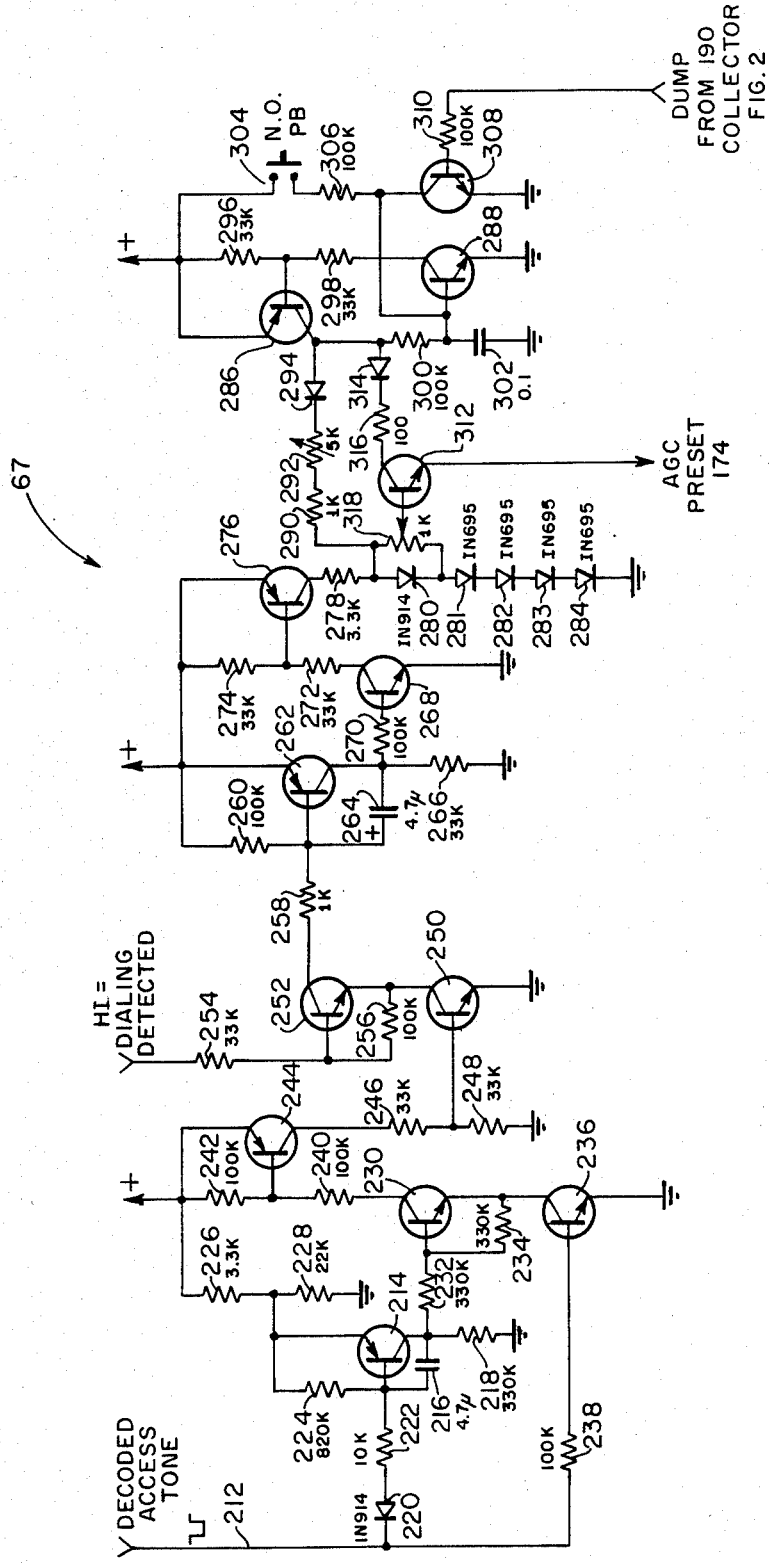
FIG. 3 is a schematic diagram of a level preset and latch circuit operative within the block diagram of FIG. 1.

The level preset and latch circuit 67, shown in detail in FIG. 3, is activated by outgoing dialing signals. The appearance and disappearance of the access signal from the remote unit enables the circuit to respond to dialing signals, if received within a set interval, typically 30 seconds. When dialing is sensed, the circuit 67 is reset with each dial signal, becoming activated after the last digit is dialed to enable a preset function in the AGC detector 72 to provide increased gain in the speaker path for the first minute or so. The decoded access tone signal, a negative going pulse, is received in circuit 76 at 212 and initiates the 30 second time interval defined by a transistor 214, capacitor 216 and a resistor 218. The Miller effect increases the effective value of the capacitor 216. The access tone signal is applied through a diode 220 and a resistor 222 to the base of transistor 214, causing it to conduct when the access signal received at 212 is in the low or active state. Resistors 226 and 228 serve to define the emitter bias point of the transistor 214 and cooperate in achieving a desired time delay. With the appearance of the access tone, the collector voltage of transistor 214 appearing across resistor 218 steadily increases in value, and is applied to the base of transistor 230 through resistor 232 to cause the transistor 230 to become conductive when the signal across the resistor 218 is above a predetermined voltage level. During the access tone, transistor 236, which also receives this signal through resistor 238, inhibits conduction through transistor 230. The transistor 236 is returned to a conducting state only after the access tone is removed. Thereafter, transistors 236 and 230 are both conductive, causing the voltage between the collector load resistors 240 and 242 to decrease sufficiently to drive the base of a transistor 244 into conduction. When transistor 244 is conducting the voltage across collector load resistors 246 and 248 increases. This voltage increase is applied to the base of a transistor 250, forming with a transistor 252, a two input AND gate. A further signal from the detector circuit 64 indicative of dialing pulses is applied to the base of the transistor 252 through a resistor 254 and a resistor 256 to cause transistor 252 to conduct. When the transistors 250 and 252 are both conductive representing the presence of dialing within the first time interval of the access tone, current is drawn through a resistor 258 and a resistor 260 which in turn commences a second time interval of typically 6 seconds. The circuitry defining this second time interval includes transistor 262, capacitor 264 and a resistor 266. The second time interval is initiated with conduction of both transistors 250 and 252 causing the voltage across resistor 266 to increase. A transistor 268 is simultaneously caused to conduct by current applied to it through resistor 270. When conductive, voltage at the collector of transistor 268 and between a pair of load resistors 272 and 274 decreases, switching on a transistor 276. The current thus switched by transistor 276 is applied through a resistor 278 and series connected diodes 280, 281, 282, 283 and 284.

This current drives the base of a transistor 312 through a potentiometer 318 across diode 280 for the six seconds of the second time interval. Transistor 312 in turn applies a voltage to capacitor 174 establishing an initial gain in amplifier 74 to boost the incoming signal applied to the speaker 78 before normal AGC operation takes over in response to outgoing voice signals. After the six second interval this preset voltage is eliminated, but the discharge time constant of capacitor 174 is sufficiently long to hold the gain of amplifier 74 up for an extended time interval.

A bi-stable latch circuit is formed by a set of transistors 286 and 288. The bi-stable circuit includes a set of resistors 296 and 298 in the collector circuit of transistor 288 with the base of transistor 286 driven from their junction. A resistor 300 and a capacitor 302 are located in the collector circuit of transistor 286 with the base of transistor 288 driven from their junction. The bi-stable circuit is set by operation of a normally open push button switch 304 which on closure applies the power supply voltage through a resistor 306, to switch transistor 288 on. A transistor 308 having switch 304 and resistor 306 in its collector circuit is switched on by a dialing pulse, resetting the latch. In the set condition, the collector of transistor 312 is powered from transistor 288 through a diode 314 and a resistor 316 in the collector circuit, and through a diode 294, variable resistor 292 and 318, and resistor 290 in the base circuit. With the transistor 312 switched on by conduction of transistor 288 a higher preset voltage is applied to capacitor 174 of AGC circuit 72 to create maximum gain in amplifier 74. The normally open push button 304 is momentarily closed by the user to cause an increase in the amplification of the signal received from the phone line, providing the listener with a maximum amplitude level. Upon dialing or hang-up conditions, bi-stable circuit is reset by energizing transistor 308 from the collector of transistor 190 within the AGC detector circuit 72, shown in FIG. 2. The user can achieve reset by pushing a dialing key.

Modifications and variations from the above disclosed implementation by those skilled in the art are considered within the scope of the present invention. Accordingly, the present invention is not to be limited to the embodiment shown, except according to the following claims.

What is claimed is:

1. A user communication system comprising:
   means for applying user generated signals to a network, said means having controllable gain;
   means for receiving signals from the network for local reproduction with controllable signal level; and
   means for oppositely adjusting the amplitude of the signals applied to the network and the signal level of the locally reproduced signal according to the level of the user generated signals, wherein:
   said means for oppositely adjusting reduces the gain of the applying means as the amplitude of the user generated signals increase.

2. The communication system of claim 1 wherein:
   said adjusting means is operative to maintain a predetermined signal level for the user generated signal applied to said network.

3. The communication system of claim 1 wherein said applying means further includes:
   a remote source for said user generated signals and includes means for transmitting said user generated signals; and
   network associated means for detecting said transmitted signals.

4. The communication system of claim 3 wherein:
   said transmitted signals comprise infrared signals;
   said means for transmitting includes means for transmitting an infrared light pulses at a rate representative of the user generated signals; and
   said detecting means includes an infrared frequency modulation detector.

5. The communication system of claim 3 wherein:
   said receiving means further comprises a loudspeaker operative to reproduce signals received from said network, wherein the loudspeaker signal level is adjusted according to the level of the detected signal.

6. The communication system of claim 5 wherein:
   said remote source includes a microphone.

7. The communication system of claim 6 wherein:
   said means for adjusting comprises an automatic gain control circuit.

8. The communication system of claim 1 further including:
   means for detecting dial signals to cause said adjusting means to reduce the level of local signal reproduction.

9. A user communications system comprising:
   means for applying user generated signals to a network, said means having controllable gain including:
      a remote source for said user generated signals including a microphone and means for transmitting said user generated signals, said transmitted user generated signals comprise infrared signals, said means for transmitting includes means for transmitting infrared light pulses at a rate representative of the user generated signals; and
      network associated means for detecting said transmitted user generated signals, including detecting means having an infrared frequency modulation detector;
   means for receiving signals from the network for local reproduction with controllable signal level, said means for receiving further comprises a loudspeaker operative to reproduce the signals received from said network, wherein the loudspeaker signal level is adjusted according to the level of the detected signal; and
   means for oppositely adjusting the amplitude of the signals applied to the network and the signal level of the locally reproduced signal according to the level of the user generated signals,
   said means for oppositely adjusting comprises an automatic gain control circuit, including
   a peak detector producing an output signal corresponding to the peak of the user generated signals.

10. The communication system of claim 9 wherein:
    said applying means includes a variable gain amplifier receiving said peak detector output signal; and
    said receiving means includes a variable gain amplifier receiving said peak detector output signal.

11. The communication system of claim 10 wherein:
    said variable gain amplifiers include means for providing equal and opposite changes in gain to maintain the system loop gain constant.

12. The communication system of claim 10 wherein:
    said variable gain amplifiers each include a controlled transistor.

* * * * *